United States Patent
Ramasubbu et al.

(10) Patent No.: US 9,761,123 B2
(45) Date of Patent: Sep. 12, 2017

(54) SYSTEM AND METHOD FOR IDENTIFYING ALARM SYSTEM PROBLEMS

(71) Applicant: Honeywell International Inc., Morristown, NJ (US)

(72) Inventors: Balakrishnan Ramasubbu, Madurai (IN); Jyothi Prasad Siremamilla, Puttur (IN); Ganesh Ramesh Hegde, Bangalore (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 374 days.

(21) Appl. No.: 14/227,422

(22) Filed: Mar. 27, 2014

(65) Prior Publication Data

US 2016/0163185 A1 Jun. 9, 2016

(51) Int. Cl.
*G08B 23/00* (2006.01)
*G08B 29/02* (2006.01)
*H04L 12/26* (2006.01)
*G08B 25/00* (2006.01)
*G08B 29/06* (2006.01)
*H04W 4/12* (2009.01)

(52) U.S. Cl.
CPC .......... *G08B 29/02* (2013.01); *G08B 25/004* (2013.01); *G08B 29/06* (2013.01); *H04L 43/10* (2013.01); *H04W 4/12* (2013.01)

(58) Field of Classification Search
CPC ...... G08B 25/004; G08B 29/02; G08B 29/06; H04W 4/12
USPC .................. 340/506, 531, 541, 653
See application file for complete search history.

(56) References Cited

U.S. PATENT DOCUMENTS

| | | | |
|---|---|---|---|
| 7,617,327 B1 | 11/2009 | Allam et al. | |
| 8,626,210 B2 | 1/2014 | Hicks, III | |
| 2007/0210909 A1 | 9/2007 | Addy | |
| 2008/0316309 A1* | 12/2008 | Roper | G08B 13/1418 348/143 |
| 2009/0273463 A1 | 11/2009 | Morwood et al. | |
| 2010/0242084 A1* | 9/2010 | Keeni | H04L 63/20 726/1 |
| 2010/0277300 A1 | 11/2010 | Cohn et al. | |

(Continued)

FOREIGN PATENT DOCUMENTS

| | | |
|---|---|---|
| DE | 20 2011 004 996 U1 | 3/2012 |
| JP | 2003-317178 A | 11/2003 |
| KR | 20060073055 A | 6/2006 |

OTHER PUBLICATIONS

Extended European search report from corresponding EP patent application 15158718.5, dated Sep. 15, 2015.

(Continued)

*Primary Examiner* — Ojiako Nwugo
(74) *Attorney, Agent, or Firm* — Husch Blackwell LLP

(57) ABSTRACT

A method and apparatus include a processor of an Internet router monitoring a parameter of messages between a security panel that protects a secured area and a central monitoring station of the secured area, detecting an interruption in the messages by comparing the parameter with a threshold value, and notifying at least the central monitoring station of the interruption via an e-mail or SMS message, wherein the interruption includes one of disconnection of the security panel, disconnection of the central monitoring station, and impersonation of the central monitoring station.

20 Claims, 1 Drawing Sheet

(56) References Cited

U.S. PATENT DOCUMENTS

2011/0169628 A1\* 7/2011 Elliot ............... H04L 12/40013
                                              340/506
2012/0047494 A1   2/2012 Unrein et al.
2012/0188072 A1   7/2012 Dawes et al.
2014/0359101 A1\* 12/2014 Dawes .................... H04L 41/18
                                              709/223

OTHER PUBLICATIONS

English-language translation of patent application DE 20 2011 004 996 U1, publication date Mar. 22, 2012.
English-language translation of patent application JP 2003-317178, publication date Nov. 7, 2003.
Examination and Search Report from corresponding Canada patent application 2,884,831, dated Jul. 4, 2016.
Examination report from corresponding EP patent application 15158718.5, dated Mar. 7, 2017.
English-language translation of KR patent application 20060073055, dated Jun. 28, 2006.

\* cited by examiner

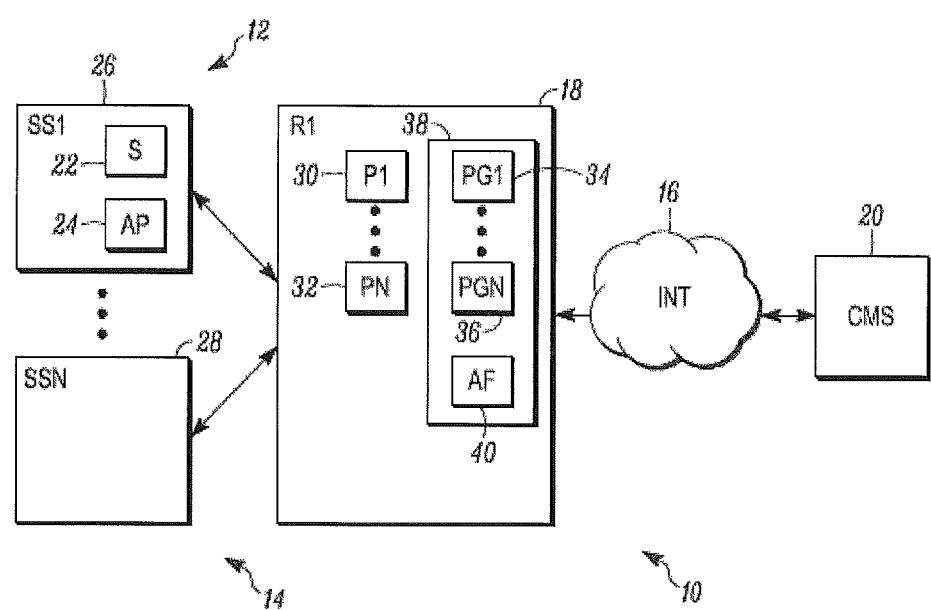

SYSTEM AND METHOD FOR IDENTIFYING ALARM SYSTEM PROBLEMS

FIELD

The field relates to security systems and, more particularly, to the monitoring of security systems.

BACKGROUND

Systems are known for the protection of secured areas. Such systems typically include the use of one or more sensors that detect threats within the secured area. A local audible alarm may also be provided to notify authorized occupants present within the secured area of detected threats.

Threats detected by such systems may include any event that threatens the health and/or safety of human occupants or assets. An example of a threat to human occupants may include toxic gas. Other threats to the safety of occupants and/or assets may include fire, explosion, or unauthorized intruders.

In general, a security system may include a control panel that monitors each of the sensors within the secured area. Where the security system is used within a home, the control panel may include a number of operational states, including armed away, disarmed, armed stay, etc. A display and a user interface may be located within the secured area and be used by an occupant of the secured area to individually select each of the operational states.

In each of the states, a processor of the control panel may monitor a respective set of sensors for activation. Upon activation of any of the sensors, the processor may send an alarm message to a central monitoring station.

While such systems work well, they are subject to false alarms. For example, an occupant may forget to disarm the system when entering the secured area. In order to avoid false alarms, security personnel of the central monitoring station will often place a telephone call to an occupant to confirm the alarm. Accordingly, a need exists for better and more reliable methods of communicating with occupants.

BRIEF DESCRIPTION OF THE DRAWINGS

The FIGURE illustrates a block diagram of a security system in accordance herewith.

DETAILED DESCRIPTION

While disclosed embodiments can take many different forms, specific embodiments thereof are shown in the drawings and will be described herein in detail with the understanding that the present disclosure is to be considered as an exemplification of the principles thereof as well as the best mode of practicing the same and is not intended to limit the application or claims to the specific embodiment illustrated.

The FIGURE is a simplified block diagram of an alarm system 10 shown generally in accordance with an illustrated embodiment. Included within the system are a number of local alarm systems 12, 14.

Each of the local alarm systems includes a number of sensors 22 that detect threats to persons or assets within a respective secured geographic area 26, 28. The sensors may be selected for sensing any of a number of different types of threats. For example, at least some of the sensors may be intrusion sensors based upon the use of limit switches placed on the doors and windows providing physical access into or egress from the secured area. In the alternative, at least some of the sensors may be embodied as fire detectors distributed throughout each secured area.

Associated with each secured area is an alarm panel. The alarm panel functions to monitor the sensors within the associated area for activation. Upon detecting activation of one of the sensors, the alarm panel composes and sends an alarm message to a central monitoring station 20 through one or more routers 18. The message may also be sent through the Internet 16, as shown in the FIGURE.

In emerging or other high growth regions, some or most of the security panels are monitored by alarm receivers (central monitoring stations) connected in the same network. The alarm receiver may be monitored by one or more security persons.

For this type of infrastructure, there is the possibility of alarm failure for any of a number of reasons. For example, there may be a network failure caused by an intruder damaging the communication connections or paths at the alarm receiver. Alternatively, a computer hacker may impersonate the alarm receiver with another server. There could be a network failure where an intruder damages the communication connection at or near the security panel.

Due to these potential problems, there can be security vulnerabilities because the events/alarms raised or otherwise initiated within the protected areas cannot be monitored, recorded, or even detected at the alarm receiver. If the alarm receiver is impersonated (replaced) with another server without any functionality to handle alarms/events, then this will lead to the impression that the server is functioning, but the intruder can still perform any of a number of unauthorized acts without being monitored or detected.

The communication at or near the alarm receiver can be lost due to accidental removal of cables by an intruder intent on damaging the network. This is difficult to detect in some cases by security personnel. Under the solution described below, this scenario can be detected and handled by software in a router that continuously monitors the status of the alarm receiver.

The loss of connection may be detected in any of a number of different ways. For example, software in the router can monitor message traffic in order to recognize a communication loss at the alarm receiver end. The router can alert a person within the secured area or a local alarm administrator of the communication loss via an SMS message or e-mail based on the details that the system is configured to be detected. The router can also alert end users of the security panels in the same way about a communication loss at the alarm receiver. In this way, the security panel users and the local administrator or security person can be alerted and can be cautious of risks until the problem is rectified and the alarm receiver is restored to a normal functional state.

As noted above, there are opportunities to impersonate (replace) the alarm receiver with another server that has no functionality in handling alarms/events perpetrated by an intruder. In these cases, the end users will feel everything is normal, but the alarm receiver will not be processing alarms, and there will be no attention paid to the risks posed by the alarm. A number of steps can be performed to address this situation. For example, alarms can be forwarded to the receiver via the router. In this case, the router verifies the MAC identifier (ID) of the alarm receiver before transferring alarms. The router can also alert the security person or local administrator of the security panel through SMS or e-mail messages in the event of a mismatch in the MAC ID of the alarm receiver. The router can also alert the end users of the security panels through the SMS or e-mail messages about the mismatch. In this way, the security panel users and the local administrator or security persons can be alerted in this typical situation where the alarm receiver is not in operation.

In the case where communication with the alarm panel is lost in the end user's home, the software in the router can alert the end users and personnel at the alarm receiver with panel details so that they can take corrective action. This case may include a number of relevant steps. First, software in the router recognizes the communication loss at the panel end. Next, the router alerts the alarm receiver with the details of the panel that lost the connection. Finally, the router also alerts the end user of that security panel through SMS or e-mail messages about the communication loss at the panel so that he/she can take corrective action. Through these steps, the security panel user and personnel at the alarm receiver can be alerted to the problem.

Under the illustrated embodiment, one or more of the routers between the local alarm systems and central monitoring station include a message interruption detection system. Message interruption means anything that interrupts the transmission of alarm messages from the local alarm panels to the central monitoring station. In this regard, message interruption may be caused by any of a number of different situations. For example, message interruptions may be caused by a loose or disconnected wire at the security panel, failure or disconnection of the central monitoring station, and impersonation of the central monitoring station.

Included within the message interruption detection system may be circuitry that provides the functionality of the interruption detection system. The circuitry may include one or more processor apparatuses (processors) 30, 32 operating under control of one or more computer programs 34, 36 loaded from a non-transitory computer readable medium (memory) 38. As used herein, reference to a step of a computer program is also a reference to the processor that executed that step.

In order to detect message interruption, a panel message processor may monitor for and verify the presence of a connection with an alarm processor within the secured area. The alarm processor may be within a local alarm panel or some other alarm processing apparatus located within the secured area.

Under one illustrated embodiment, the panel message processor may verify the presence of the connection with local alarm panels by measuring the length of time between messages exchanged between the router and secured area. In the case of a local alarm system that periodically transmits status messages, this may simply involve the use of a timer that compares the time since the last message with a threshold value. If the time since the last message exceeds the threshold value, then the panel message processor may compose and send a channel loss alert to a person within the secured area that is designated to receive such messages. The alert may be in the form of a short message service (SMS) message or e-mail to a smart phone or tablet of the authorized person. The panel message processor may also send a SMS or e-mail message to some other security person not within the secured area (e.g., a local administrator who is in charge of security operations for the secured site), but who is still authorized to receive such messages. In this case, an alert file 40 within the router may contain one or more system identifiers (e.g., telephone number, e-mail address, etc.) of such persons.

Alternatively, if the local alarm processing apparatus within the secured area does not periodically transmit status messages, then the panel message processor may periodically (e.g., every 10 seconds, every one minute, etc.) ping the alarm processing apparatus. In this case, the pinging of the local alarm processor causes the processor to return an acknowledgement message, thereby verifying the integrity of the communication connection. Again, if there is no response to the ping, then the panel message processor may send an alert to local or other personnel.

In another embodiment, the message processor may also verify that alarm messages from the local secured area are, in fact, being delivered to the central monitoring station. In order to perform this test, the router may save a media access control (MAC) address of the central monitoring station in memory of the router. Periodically, a communication processor may ping the system address (e.g., the IP address) of the central monitoring station. Included within the acknowledgement to the ping is the MAC address of the apparatus that responded to the ping message. A comparison processor may compare the MAC address returned from the address of the central monitoring station with the MAC address saved in memory. In this case, the MAC address saved in memory is a threshold value that when not exactly matched, causes the router to send an alert to the secured area, to a person designated to receive messages for the secured area, and to persons of the central monitoring station through a separate communication channel (e.g., SMS, e-mail, etc.) saved in the memory of the router.

In another embodiment, the message processor of the router may also verify the integrity of the communication connection with the central monitoring station. This may be performed via a monitoring processor intercepting periodic status request messages and responses between the central monitoring stations and one or more of the local alarm processors. If a status request and response messages are not received for a time period that exceeds a threshold value, then the router sends an alert to persons at the central monitoring station. The router may also send an alert to a person within the secured area and/or a person designated to receive messages for the secured area.

In general, the system may include a processor of an Internet router monitoring a parameter of messages between a security panel that protects a secured area and a central monitoring station of the secured area, detecting an interruption in the messages by comparing the parameter with a threshold value, and notifying at least the central monitoring station of the interruption via an e-mail or SMS message, wherein the interruption includes one of disconnection of the security panel, disconnection of the central monitoring station, and impersonation of the central monitoring station.

In another embodiment the apparatus includes a processor of an Internet router that monitors a parameter of messages between a security system that protects a secured area and a central monitoring station of the secured area, a that detects an interruption in the messages by comparing the parameter with a reference value, and that notifies at least the central monitoring station of the interruption via an e-mail or SMS message, wherein the interruption includes one of disconnection of the security system, disconnection of the central monitoring station, and impersonation of the central monitoring station.

In still another embodiment, the apparatus includes a plurality of security systems each of which detects threats within a respective secured area and a processor of an Internet router coupled to each of the plurality of security systems that monitors a parameter of messages between each of the plurality of the security systems and a central monitoring station, that detects an interruption in the messages by comparing the parameter with a reference value, and that notifies at least the central monitoring station of the interruption via an e-mail or SMS message, wherein the interruption includes one of disconnection of one of the plurality of security systems, disconnection of the central monitoring station, and impersonation of the central monitoring station.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the FIGURE do not require the particular order shown or sequential order to achieve desirable results. Other steps may be provided, steps may be eliminated from the described flows, and other components may be added to or removed from the described embodiments.

The invention claimed is:

1. A method comprising:
a processor of an Internet router monitoring a parameter of messages transmitted between a security panel that protects a secured geographic area and a central monitoring station;
the processor of the Internet router detecting an interruption in the messages transmitted between the security panel and the central monitoring station by comparing the parameter with a threshold value; and
the processor of the Internet router notifying at least a local administrator or a security person of the interruption via an e-mail or SMS message, wherein the interruption includes one of disconnection of the security panel, disconnection of the central monitoring station, and impersonation of the central monitoring station.

2. The method as in claim 1 wherein notifying the local administrator or the security person further comprises sending the SMS message or the e-mail.

3. The method as in claim 1 further comprising sending a notification of the interruption to the security panel within the secured geographic area when the interruption is the disconnection of the central monitoring station or the impersonation of the central monitoring station.

4. The method as in claim 3 wherein the notification to the security panel comprises the SMS message or the e-mail.

5. The method as in claim 1 wherein the parameter comprises a media access control (MAC) address of the messages intended for the central monitoring station.

6. The method as in claim 5 wherein the threshold value comprises the MAC address of the central monitoring station, and wherein the MAC address of the messages believed to be from the central monitoring station are compared with the MAC address stored in memory.

7. The method as in claim 1 wherein the parameter comprises a time between the messages sent between the security panel and the central monitoring station.

8. The method as in claim 1 wherein the messages transmitted between the security panel and the central monitoring station comprise alarm messages.

9. The method as in claim 1 wherein the messages transmitted between the security panel and the central monitoring station comprise status messages.

10. The method as in claim 1 wherein the messages transmitted between the security panel and the central monitoring station comprise a status response from the security panel.

11. An apparatus comprising:
a processor of an Internet router that monitors a parameter of messages transmitted between a security system that protects a secured geographic area and a central monitoring station, that detects an interruption in the messages transmitted between the security system and the central monitoring station by comparing the parameter with a reference value, and that notifies at least a local administrator or a security person of the interruption via an e-mail or SMS message,
wherein the interruption includes one of disconnection of the security system, disconnection of the central monitoring station, and impersonation of the central monitoring station.

12. The apparatus as in claim 11 wherein a notification to the local administrator or the security person comprises the SMS message or the e-mail.

13. The apparatus as in claim 11 wherein the processor sends a notification of the interruption to a control panel of the security system when the interruption is the disconnection of the central monitoring station or the impersonation of the central monitoring station.

14. The apparatus as in claim 13 wherein the notification to the control panel comprises the SMS message or the e-mail.

15. The apparatus as in claim 11 wherein the parameter comprises a media access control (MAC) address of the central monitoring station.

16. The apparatus as in claim 11 wherein the parameter comprises a time between the messages sent between the security system and the central monitoring station.

17. The apparatus as in claim 11 wherein the messages transmitted between the security system and the central monitoring station comprise alarm messages.

18. The apparatus as in claim 11 wherein the messages transmitted between the security system and the central monitoring station comprise status messages.

19. The apparatus as in claim 11 wherein the messages transmitted between the security system and the central monitoring station comprise a status response from the security system.

20. An apparatus comprising:
a plurality of security systems each of which detects respective threats within respective secured areas; and
a processor of an Internet router coupled to each of the plurality of security systems that monitors a parameter of messages transmitted between each of the plurality of security systems and a central monitoring station, that detects an interruption in the messages transmitted between each of the plurality of security systems and the central monitoring station by comparing the parameter with a reference value, and that notifies at least a local administrator or a security person of the interruption via an e-mail or SMS message,
wherein the interruption includes one of disconnection of one of the plurality of security systems, disconnection of the central monitoring station, and impersonation of the central monitoring station.

* * * * *